US011860901B1

United States Patent
Ramarathinam et al.

(10) Patent No.: US 11,860,901 B1
(45) Date of Patent: Jan. 2, 2024

(54) SQL EXECUTION OVER HTTP FOR RELATIONAL DATABASES USING CONNECTION POOLING

(71) Applicant: Amazon Technologies, Inc., Seattle, WA (US)

(72) Inventors: Aravind Ramarathinam, Sammamish, WA (US); Sachin Honnudike, Seattle, WA (US); Parijatham Santosh Kumar Vodela, Seattle, WA (US); Brian Welcker, Seattle, WA (US); Anoop Gupta, Seattle, WA (US); Sandor Loren Maurice, Newcastle, WA (US); Amit Purohit, Issaquah, WA (US); Tanmoy Dutta, Sammamish, WA (US); Yuhui Yuan, Seattle, WA (US); Jagdeep Singh Sidhu, Vancouver (CA); Lawrence Webley, Seattle, WA (US); Sundaresan Krishnamurthy, Bothell, WA (US); James H. Mlodgenski, Brick, NJ (US); Ramakrishna Dwivedula, San Jose, CA (US); Serhii Poliakov, Mercer Island, WA (US); Alexey Kuznetsov, New Westminster (CA)

(73) Assignee: Amazon Technologies, Inc., Seattle, WA (US)

( * ) Notice: Subject to any disclaimer, the term of this patent is extended or adjusted under 35 U.S.C. 154(b) by 529 days.

(21) Appl. No.: 16/370,384

(22) Filed: Mar. 29, 2019

(51) Int. Cl.
*G06F 16/28* (2019.01)
*G06F 16/901* (2019.01)
(Continued)

(52) U.S. Cl.
CPC ........ *G06F 16/284* (2019.01); *G06F 16/9017* (2019.01); *G06F 16/953* (2019.01); *H04L 67/02* (2013.01)

(58) Field of Classification Search
CPC ... G06F 16/284; G06F 16/953; G06F 16/9017
See application file for complete search history.

(56) References Cited

U.S. PATENT DOCUMENTS 8,751,613 B1 * 6/2014 Medved ................. H04L 47/10
709/220
10,511,675 B1 * 12/2019 Chud ..................... H04L 67/52
(Continued)

OTHER PUBLICATIONS

Varia et Mathew, "Overview of Amazon Web Services," Jan. 2014, Amazon Web Services, accessed Nov. 30, 2022, pp. 1-22.*
(Continued)

*Primary Examiner* — Pierre M Vital
*Assistant Examiner* — Jedidiah P Ferrer
(74) *Attorney, Agent, or Firm* — Nicholson De Vos Webster & Elliott LLP

(57) ABSTRACT

Techniques for query execution against relational databases using connection pooling are described. According to some embodiments, a query processing service is disclosed that enables users to execute queries against target relational databases implemented by a relational database service. The service receives query requests originated by a client application at a web service endpoint and identifies a connection to a particular target database. In some examples, the query request is a Hyper Text Transfer Protocol (HTTP) message comprising a query to be executed by a target database instance within the provider network. The service transmits the query for execution at the target database via the connection and obtains a query result based on the execution of the query. The service transforms the query result into a
(Continued)

format suitable for the client and transmits a query response to the client.

20 Claims, 9 Drawing Sheets

(51) Int. Cl.
*H04L 67/02* (2022.01)
*G06F 16/953* (2019.01)

(56) References Cited

U.S. PATENT DOCUMENTS

| | | | | |
|---|---|---|---|---|
| 10,897,468 | B1* | 1/2021 | Chhabra | G06F 16/9017 |
| 2008/0288547 | A1* | 11/2008 | Brodsky | G06F 16/958 |
| | | | | 707/E17.005 |
| 2013/0086626 | A1* | 4/2013 | Kavantzas | H04L 63/10 |
| | | | | 709/223 |
| 2015/0095343 | A1* | 4/2015 | Divilly | H04L 67/327 |
| | | | | 707/741 |
| 2015/0189034 | A1* | 7/2015 | Kelkar | H04L 67/01 |
| | | | | 709/203 |
| 2016/0092059 | A1* | 3/2016 | Tu | G06F 16/252 |
| | | | | 715/738 |
| 2016/0094582 | A1* | 3/2016 | Watson | H04L 41/0273 |
| | | | | 726/1 |
| 2017/0278005 | A1* | 9/2017 | Cunningham | G06F 16/958 |
| 2018/0150510 | A1* | 5/2018 | Tanaka | G06F 16/2445 |

OTHER PUBLICATIONS

Mathew, "Overview of Amazon Web Services," Nov. 2014, Amazon Whitepapers, accessed Nov. 30, 2022, pp. 1-30.*
Bhatt, "SAP Query—Creation & Execution—Table Join & Logical Database," May 9, 2014, accessed Nov. 30, 2022, pp. 1-11.*
Hinden, et al., "Unique Local IPv6 Unicast Addresses", Network Working Group, Request for Comments: 4193, Oct. 2005, 16 pages.
Rekhter, et al., "Address Allocation for Private Internets", Network Working Group, Request for Comments: 1918, Feb. 1996, 9 pages.

* cited by examiner

| FIELD NAME | TYPE | DESCRIPTION |
|---|---|---|
| 505 { TARGET DATABASE NAME | STRING | USER-PROVIDED NAME FOR THE TARGET DATABASE |
| 510 { DATABASE | STRING | TARGET DATABASE INSTANCE |
| 515 { SCHEMA | STRING | TARGET SCHEMA |
| 520 { SQL STATEMENT | STRING | SQL STATEMENT STRING |
| 525 { USER ACCOUNT CREDENTIALS | STRING | TARGET DATABASE USER AUTHENTICATION CREDENTIALS |

SQL EXECUTION OVER HTTP FOR RELATIONAL DATABASES USING CONNECTION POOLING

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers. However, as the scale and scope of typical data centers has increased, the tasks of provisioning, administering, and managing the physical computing resources have become increasingly complicated.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical computing machine to be shared among multiple users by providing each user with one or more virtual machines hosted by the single physical computing machine. Each such virtual machine is a software simulation acting as a distinct logical computing system that provides users with the illusion that they are the sole operators and administrators of a given hardware computing resource, while also providing application isolation and security among the various virtual machines. Furthermore, some virtualization technologies are capable of providing virtual resources that span two or more physical resources, such as a single virtual machine with multiple virtual processors that spans multiple distinct physical computing systems. As another example, virtualization technologies may allow data storage hardware to be shared among multiple users by providing each user with a virtualized data store which may be distributed across multiple data storage devices, with each such virtualized data store acting as a distinct logical data store that provides users with the illusion that they are the sole operators and administrators of the data storage resource.

One example of a service provided by public data center operators (also referred to herein as "service provider networks", or just "provider networks") is a database service. Database services typically support an array of databases that can store and manage large amounts of data. Database services must have the ability to handle several requests across multiple clients accessing the databases at the same time. However, because application loads are highly variable, such database services must be able to rapidly scale up and scale down the number of requests sent to the databases.

BRIEF DESCRIPTION OF DRAWINGS

Various embodiments in accordance with the present disclosure will be described with reference to the drawings, in which:

FIG. 5 illustrates an example of an API request to execute a query in accordance with an embodiment of the present disclosure.

DETAILED DESCRIPTION

Figure 1:
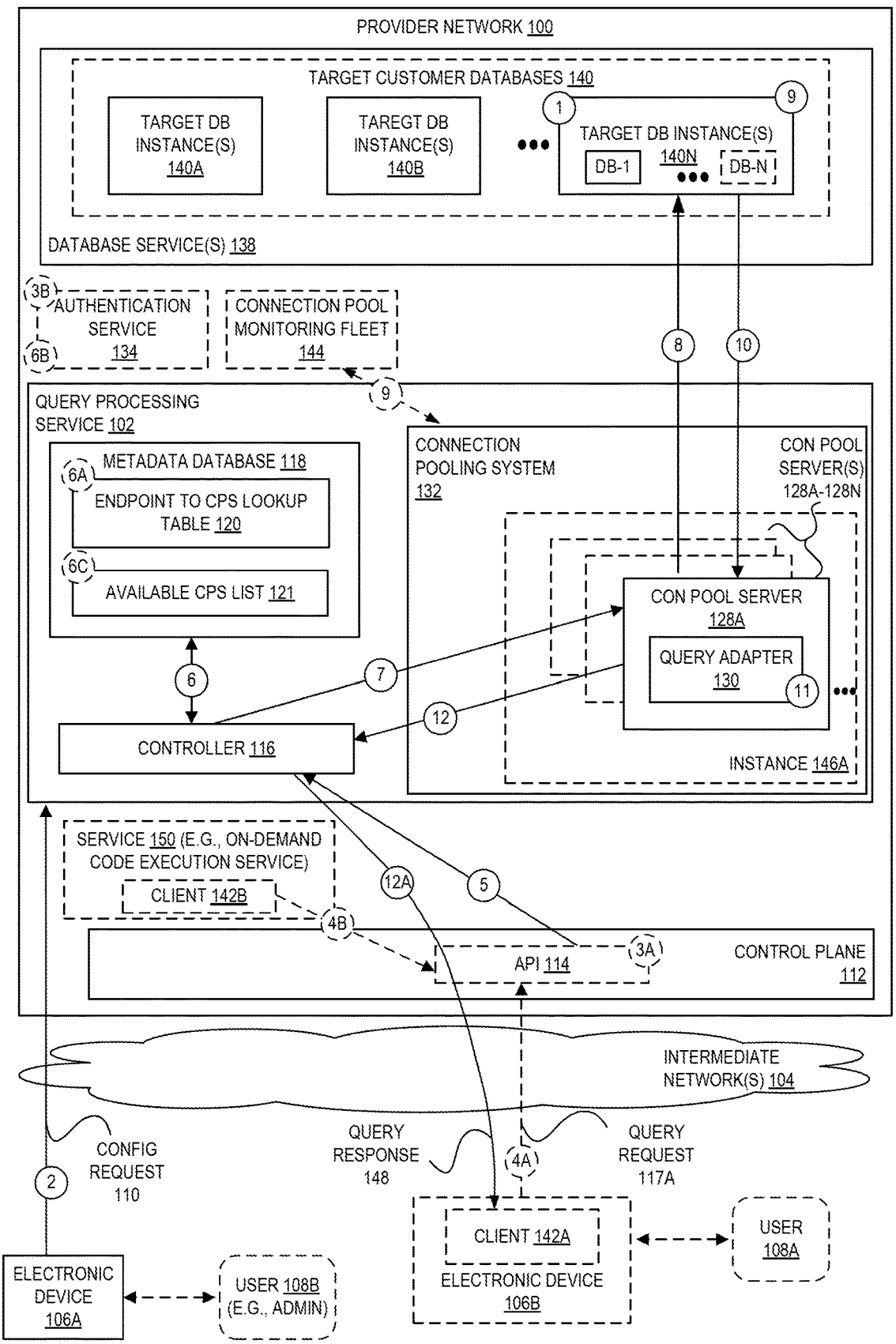
FIG. 1 is a block diagram illustrating an environment for providing a query processing service according to an embodiment of the present disclosure.

Various embodiments for query execution in a provider network are described. According to some embodiments, a service (e.g., a "query processing service") is disclosed that enables users to execute Structured Query Language (SQL) queries against relational databases over HyperText Transfer Protocol (HTTP) using connection pooling. The query processing service may execute user-provided queries against data stored by (or accessible to) a database service, which may be part of a same provider network as the query processing service. In an embodiment, the database service is a relational database service, or implements one or more relational databases. The database service may implement, for example, one or more "traditional" query processing systems (e.g., MySQL, MariaDB, PostgreSQL, H2, Microsoft SQL Server, Oracle, etc.), one or more NoSQL databases, one or more object database management systems, one or more object-relational database systems, one or more data warehouse systems (e.g., Amazon Redshift), a "serverless" interactive query service (e.g., Amazon Athena), a distributed "Big Data" processing system (e.g., Apache Spark), etc. The query processing service can be queried using a query written in one or more query languages (as defined by a query language definition), such as one or more of the many dialects, extensions, and implementations of SQL, such as Transact-SQL (T-SQL), Procedural Language/SQL (PL/SQL), PL/pgSQL (Procedural Language/PostgreSQL), SQL-86, SQL-92, SQL:2016, etc.

Traditionally, applications built using native SQL protocols require a persistent connection to a database and the use of language-specific drivers to connect to and query the database. This may require users to manage database connection pools within their application and connection pooling frameworks to establish connections to the databases. Embodiments of the disclosed query processing service eliminate the need for users to manage connections to the databases and/or the use of language-specific drivers to connect to databases while executing queries against the databases.

In some embodiments, the query processing service configures a web service endpoint that client applications may connect to in order to execute queries against the databases through the endpoint. The web service endpoint is easily accessible to the client application and abstracts the concept of database connections and connection pooling for users. Thus, users can query information from the databases without having to configure or manage connections to the databases. In some examples, the query processing service receives a query request at the web service endpoint and identifies a connection to a particular target database. The query request may comprise a HTTP message that includes a statement to be executed by the target relational database within a provider network. The statement could be an SQL statement, a Data Manipulation Language (DML) statement, an SQL query, or other command that could be executed by the target relational database. The query processing service transmits the statement for execution at the target database via an existing connection and obtains a query result based on the execution of the statement. The query processing service transforms the query result into a format suitable for the client and transmits a query response to the client.

FIG. 1 is a block diagram illustrating an environment for providing a query processing service according to an embodiment of the present disclosure. In an embodiment, a query processing service, an authentication service, and a database service operate as part of a service provider network 100 and each comprises one or more software modules executed by one or more electronic devices at one or more data centers and geographic locations. The service provider network 100 in FIG. 1 shows only a select number of services for illustrative purposes; in general, a service provider network 100 may provide many different types of computing services as part of the provider network.

A provider network 100 provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services, such as a hardware virtualization service that can execute compute instances, a storage service that can store data objects, etc. The users (or "customers") of provider networks 100 may utilize one or more user accounts that are associated with a customer account, though these terms may be used somewhat interchangeably depending upon the context of use. Users may interact with a provider network 100 across one or more intermediate networks 104 (e.g., the internal via one or more interface(s), such as through use of Application Programming Interface (API) calls, via a console implemented as a website or application, etc. The interface(s) may be part of, or serve as a front-end to, a control plane 112 of the provider network 100 that includes "backend" services supporting and enabling the services that may be more directly offered to customers.

To provide these and other computing resource services, provider networks 100 often rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance hosted by the provider network to perform a variety of computing tasks or may indirectly utilize a compute instance by submitting code to be executed by the provider network, which in turn utilizes a compute instance to execute the code (typically without the user having any control of or knowledge of the underlying compute instance(s) involved).

According to some embodiments described herein, a query processing service 102 enables users to execute queries against target customer databases without users having to configure or manage the connections to the databases. The query processing service sets up web service endpoints to the databases that enables client applications to access the databases through these endpoints. For example, a web service endpoint can correspond to a unique identifier (e.g., an Internet Protocol (IP) address) that is exposed to a client application for executing query requests from users.

In some embodiments, the query processing service receives query requests originated by the client application and identifies a connection to a particular target database. In some examples, the query request comprises a HTTP message carrying a payload. The payload of the HTTP message comprises a query to be executed by a target database instance within the provider network, which may be expressed as SQL, for example. The query processing service 102 transmits the query for execution at the target database via the connection and obtains a query result based on the execution of the query. The query processing service 102 transforms the query result into a format suitable for the client and transmits a query response to the client. The query processing service 102 may be implemented in whole or in part within the provider network 100. Additional operations performed by the query processing service 102 are described in more detail below.

At circle "1," the database service 138 sets up target customer databases 140. The target customer databases 140 may comprise one or more target database instances 140A to 140N. Each target database instance (e.g., 140A) can store data related to a tenant or customer or user of the provider network 100. In some examples, a target database instance can be made up of a cluster of one or more database instances. In other examples, a target database instance (e.g., 140N) can comprise one or more individual databases. Each database, for instance, may be a schema that represents a collection of tables in the target database instance. The database service 138 may be implemented as a relational database service 138 in one example, and the target database instances may be implemented as relational database instances in the provider network 100. Each database instance may be identified by a database instance identifier and may be associated with a user account and/or one or more permissions indicating which users may access and/or query a particular database instance in which ways (e.g., read only, read and write, etc.). Once provisioned, the database instances may be queried using SQL to perform typical database operations such as create, delete, select, update, insert, etc., with tables in the database instance.

Figure 4:
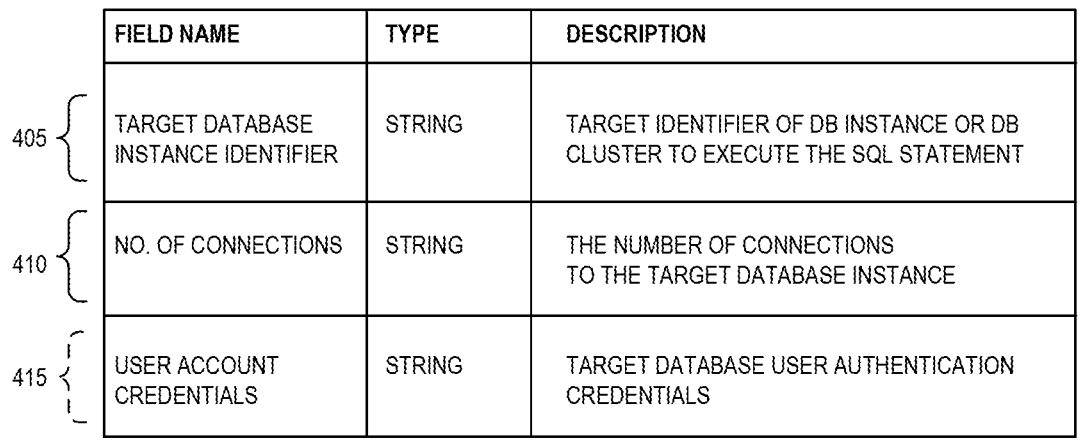
FIG. 4 illustrates an example of a web service endpoint creation API request in accordance with an embodiment of the present disclosure.

In certain embodiments, prior to receiving query requests from users, at circle "2," a user 108B (e.g., an administrator of a target database instance (e.g., 140A)) may interact with a user interface (UI) of an electronic device 106A to cause the electronic device 106A to transmit a configuration request 110 to setup a web service endpoint for a target database instance, though in other embodiments a client application executed by the electronic device 106A may transmit such a configuration request 110 without any instant user 108B interaction. Examples of an electronic device 106A include personal computers (PCs), cell phones, handheld messaging devices, laptop computers, set-top boxes, personal data assistants, electronic book readers, wearable electronic devices (e.g., glasses, wristbands, monitors), and the like. The web service endpoint may be (or be associated with) a unique identifier that, for example, a client 142A of electronic device 106B can use to execute query requests. The web service endpoint may be setup by the user 108B by submitting an endpoint configuration request 110 to the query processing service 102. In one example, the endpoint configuration request comprises a HTTP request message carrying a payload comprising one or more parameters, such as an identifier of the target database instance, the number of connections associated with the target database instance, and/or access permissions to access the target database instance. In one implementation, the endpoint configuration request is modeled as an API request and the endpoint configuration request may be submitted by the user via an API call to the query processing service 108. FIG. 4 illustrates an example of a web service endpoint creation API request (e.g., configuration request 110), which will be described later herein.

At "3A", the query processing service 102 configures the web service endpoint to the target database instance identified in the endpoint configuration request 110. A client (e.g., client 142A or client 142B) can connect to the associated target database instance (e.g., target database instance 140N) using the web service endpoint via a web service API 114 in the control panel 112. At "3B," the query processing service 102 may communicate with an authentication service 134 to set up the necessary permissions required for users to access the web service endpoint prior to receiving query requests from the users.

At circle "4A", a query request 117A is received by a control plane 112 of the provider network. In one example, the query request 117A may be originated by a client application 142A of electronic device 106B, which may potentially occur responsive to a user 108A interacting with the client 142A. In some examples, the query request 117A may be received via the API 114 in the control plane 112 which may then transmit the query request to the controller 116 in the query processing service 102. The control plane 112 handles many of the tasks involved in accepting and processing requests from users, including traffic management, authorization and access control, monitoring, and API management. For example, in some embodiments the control plane 112 creates, publishes, maintains, and monitors various APIs for users to access and interact with services of the provider network 100.

In certain examples, the query request 117A comprises a HTTP message carrying a payload comprising a query to be executed by a target database instance (e.g., 140N) within the provider network 100. In one implementation, the query request 117A can be modeled as a web service API request. For example, a user may interact with a client 142A (e.g., as part of an application), causing the client 142A to submit an "execute SQL" web service API query request 117A via client 142A to execute an SQL query against the target customer database. FIG. 5 illustrates one example of an "execute SQL" API query request 117A, which will be described in greater detail later herein. The control plane 112 (and/or controller 116) may also implement a variety of other APIs for query execution by users. These APIs may include one or more of, for example, a "get items" API that fetches one or more rows from a table in the customer database instance using a SQL predicate provided by the user, an "insert item" API for inserting values for one or more rows in the customer database instance, an "update items" API that updates the values of one or more rows in the customer database instance, a "delete item" API that deletes zero or more items using an indexed column from a table in the customer database instance, and the like.

In other examples, as shown by the circle labeled "4B," a query request 117A can also originate from another client 142B implemented within another service 150 in the provider network 100 such as an on-demand code execution service, a hardware virtualization service, or another service implemented by the provider network.

For example, the client 142B may be a "serverless" function that may include code provided by a user or other entity that can be executed on demand Serverless functions may be maintained within provider network 100 and may be associated with a particular user or account, or may be generally accessible to multiple users and/or multiple accounts. Each serverless function may be associated with a URL, URI, or other reference, which may be used to call the serverless function. Each serverless function may be executed by a compute instance, such as a virtual machine, container, etc., when triggered or invoked. In some embodiments, a serverless function can be invoked through an API call or a specially formatted HTTP request message. Accordingly, users can define serverless functions that can be executed on demand, without requiring the user to maintain dedicated infrastructure to execute the serverless function. Instead, the serverless functions can be executed on demand using resources maintained by the provider network 100. In some embodiments, these resources may be maintained in a "ready" state (e.g., having a pre-initialized runtime environment configured to execute the serverless functions), allowing the serverless functions to be executed in near real-time.

At circle "5," the control plane 112 submits the query request 117A to a controller 116 of the query processing service 102, which may be implemented as software, hardware, or a combination of both. The query processing service 102 then performs a series of operations to associate the target database instance with a connection pool server, establish a connection to the target database instance using the connection pool server, initiate the execution of the user's query against the target database instance and provide query results to the user. The operations performed by the query processing service 102 are discussed in detail below.

At "6A," the controller 116 determines if there is an existing connection to the target database instance. For example, an existing connection can be determined by performing a lookup in an endpoint-to-connection pool server lookup table 120 (or other data structure known to those of skill in the art for performing lookups or otherwise determining associations) in a metadata database 118. In some embodiments, the lookup table 120 stores information that associates the web service endpoint to a connection pool server (CPS) 128 that can establish a connection to the target database instance for the query request. In certain embodiments, each CPS is identified by a distinct port number and can be a separate connection point to a particular target database instance in the set of target database instances (140A-140N). A CPS may be implemented, for example, using a web server and connection pool libraries known to those of skill in the art, such as the HikariCP JDBC connection pool library, Vibur DBCP connection pool library, the Apache Tomcat JDBC connection pool, etc.

In some embodiments, each CPS may comprise a set of one or more connection slots. Each connection slot may correspond to a connection established by the CPS to an individual database within a particular target database instance (e.g., 140N). In some examples, the number of connection slots in a CPS may correspond to the number of query requests that can arrive concurrently to the CPS to execute queries against different databases within a particular target database instance.

The metadata database 118 stores information related to endpoints and unused CPSs. For example, information related to endpoints may include a target identifier of a target database instance or database cluster associated with the endpoint, and target database user authentication credentials. Information related to unused CPSs may include, for example, a CPS identifier for the CPS, the target customer database identifier associated with the CPS, user authorization details, and a number of connection slots provided by the CPS. In some embodiments, the metadata database 118 could include an in-memory cache (not shown in FIG. 1) to perform lookups or otherwise determine associations between web service endpoints and CPSs.

If an existing connection to a target database instance can be found by the controller 116, for instance, by determining using the lookup table 120 that there is an association of the target database instance to a first CPS in the lookup table then, in certain embodiments, the controller 116 may associate the target database instance with the CPS in the lookup table. At "6B", the controller may communicate with the authentication service 134 at circle to authenticate the user's access to the target database instance prior to transmitting the query for execution to the target database instance via the CPS, e.g., based on data included with the query request 117A (e.g., credentials, encrypted material, etc., as is known in the art for performing user identification and authorization). At "7", the controller 116 directly transmits the user's query to the identified CPS in the connection pooling system 132.

However, if an existing connection to the target database instance cannot be found (e.g., based on a lookup in the lookup table 120), then at "6C," the controller 116 selects and identifies a CPS from an available CPS list 121 that can establish a connection to the target database instance and updates the lookup table 120 to assign/associate the selected CPS with the target database instance. At this point, the controller 116 can communicate with the authentication service 134 at circle "6B" to authenticate the user's access the target database instance using the selected CPS.

In certain embodiments, the controller 116 may be implemented as a fleet of instances that can be horizontally scaled and managed by the query processing service 102. Each instance in the fleet of instances may comprise logic to determine whether to route a query request to an existing connection (CPS) or assign a new connection (CPS) for a query request if a connection to a target database instance is not available.

In some embodiments, a connection pool monitoring fleet 144 monitors a set of database connections to the target database instances 140A-140N. For example, at circle labeled "9," which may occur prior to or after receipt of a query from the controller 116, the connection pooling system 132 may communicate with a connection pool monitoring fleet 144 to initialize and launch a set of one or more CPSs to the target database instances. The creation of a new CPS may include, for example, launching a new web server together with an application utilizing a connection library as described herein. In some embodiments, the CPS may be deployed on a common compute instance 146A (e.g., VM) as one or more CPSs 128A-128N, and in some embodiments multiple such instances 146A-146Z across one or potentially many host computing devices may be used by the query processing service 102. In certain embodiments, the creation of a new CPS may involve assigning a port number to be used for the CPS to reach the particular target database instance. A newly created CPS may also include an identifier of the particular target database instance (e.g., an IP address, a unique database identifier within the context of the database service 138, etc.) to connect to, a minimum number of connections that the CPS is to form with the target database instance, a maximum number of connections that the CPS is to form with the target database instance, an identifier of a location where a secret value is kept within the provider network 100 that can be used by the target database instance for query authorization and/or authentication, etc. As described herein, the minimum connection value may refer to a minimum number of connection slots provided by the CPS, whereas the maximum connection value may refer to a maximum number of connection slots provided by the CPS. In one example, the minimum connection value can be one connection slot and the maximum connection value can be five connection slots.

In certain embodiments, the connection pool monitoring fleet 144 monitors a pool of database connections to the target database instances 140A-140N. The connection pool monitoring fleet 144 may also monitor a variety of information related to the pool of connections. For example, it may monitor among other parameters, the maximum number of active connections, the maximum number of idle connections, the number of active connections that are being used at once, the number of connections that are being requested at once, the time to acquire a connection, SQL statement execution time, and so on. The connection pool monitoring fleet 144 may then, in some embodiments, automatically create database connection pools for users, dynamically scale the number of connections to adapt to varying workloads of query requests submitted to the target database instances 140A-140N, scale up the amount of computing resources available for connection pool servers, etc.

At circle "7" the controller 116 may transmit the query request 117A (or a subset thereof, such as the query itself and perhaps user authentication/authorization information carried therein) issued on behalf of the user to the identified CPS (e.g., CPS 128A). The CPS may be identified by a unique port number and the controller 116 may transmit query request 117A to this port number. The port number identifying a CPS may be mapped to a particular target database instance (e.g., 140N) or to different databases within the target database instance.

At circle "8" the CPS initiates the execution of the query against the target database instance by sending the query (and optionally, the additional information such as user authentication/authorization information) over the existing connection(s)—e.g., via proxy service, or directly to the target database instance.

At circle "9" the target database instance executes the query, and at circle "10" the target database instance provides a query result to the CPS 128A. At circle "11," a query adaptor 130 in the CPS may transform the query result into a query format that is suitable for the client 142A—e.g., the query adapter 130 may transform a database engine-specific query result format into a common format such as eXtensible Markup Language (XML), JavaScript Object Notation (JSON), etc. At circle "12," the CPS 128A transmits a query response 148 to the client 142A based on the query result—for example, as shown the CPS 128A may send the query response 148 at circle "12" to the controller 116, which then sends the query response 148 at circle "12A" back to the client 142A. The query response 148 may comprise one or more HTTP messages carrying a payload with the "transformed" query result.

For example, the query adaptor 130 may transform a query result into an XML with a top level "SqlStatementResults" field carrying a list of SqlStatementResult values. A SqlStatementResult may include two values, where only one is populated—a ResultSet struct value that is returned if the query was a "regular" database query, and a NumberOfRowsUpdated value indicating a number of rows updated if the statement was an insert, update, or delete query (or specialized API call for performing one of these operations, as described herein).

Each ResultSet struct may include a ResultSetMetadata struct including metadata about the results in the form of a list of columns and their types and may include a Rows list of Row structs. The ResultSetMetadata may include a ColumnInfos field carrying a list of ColumnInfo structs, where a ColumnInfo struct includes fields for Name (of column), Type (of column), Nullable (NOT_NULL or NULLABLE or UNKNOWN), and/or Precision (e.g., number of floating-point digits). Each Row struct may be an array (or list) of Data values, where each is cast as a string.

Of course, variations from the above proscribed format may be flexibly used in different embodiments. By way of example, in some embodiments the query response may carry the transformed query result as JSON, and may be something akin to the following, which includes both metadata about the columns that are returned and the data itself:

```
[
    {
        'ColumnInfo': {
            'Name':'Sports',
            'Type':'varchar (255)'
        }
    }, {
        'Resultset' :
            {'Row': 'hockey'},
            {'Row': 'football'},
            {'Row': 'volleyball'},
            {'Row': 'tennis'},
            {'Row': 'basketball'}
    }
]
```

In other examples, the query response may carry the transformed query result in other serialized formats known in the art such as the "protocol buffer" format which is a language and platform independent format for serializing structured data in a query result. In some examples, the query response may be streamed back to the client. Beneficially, by returning query results in a common format, client application code can more simply interact with a variety of different types of databases despite these different types of databases natively returning results in different formats. Instead, the query processing service 102 can present a unified format for these results.

Figure 2:
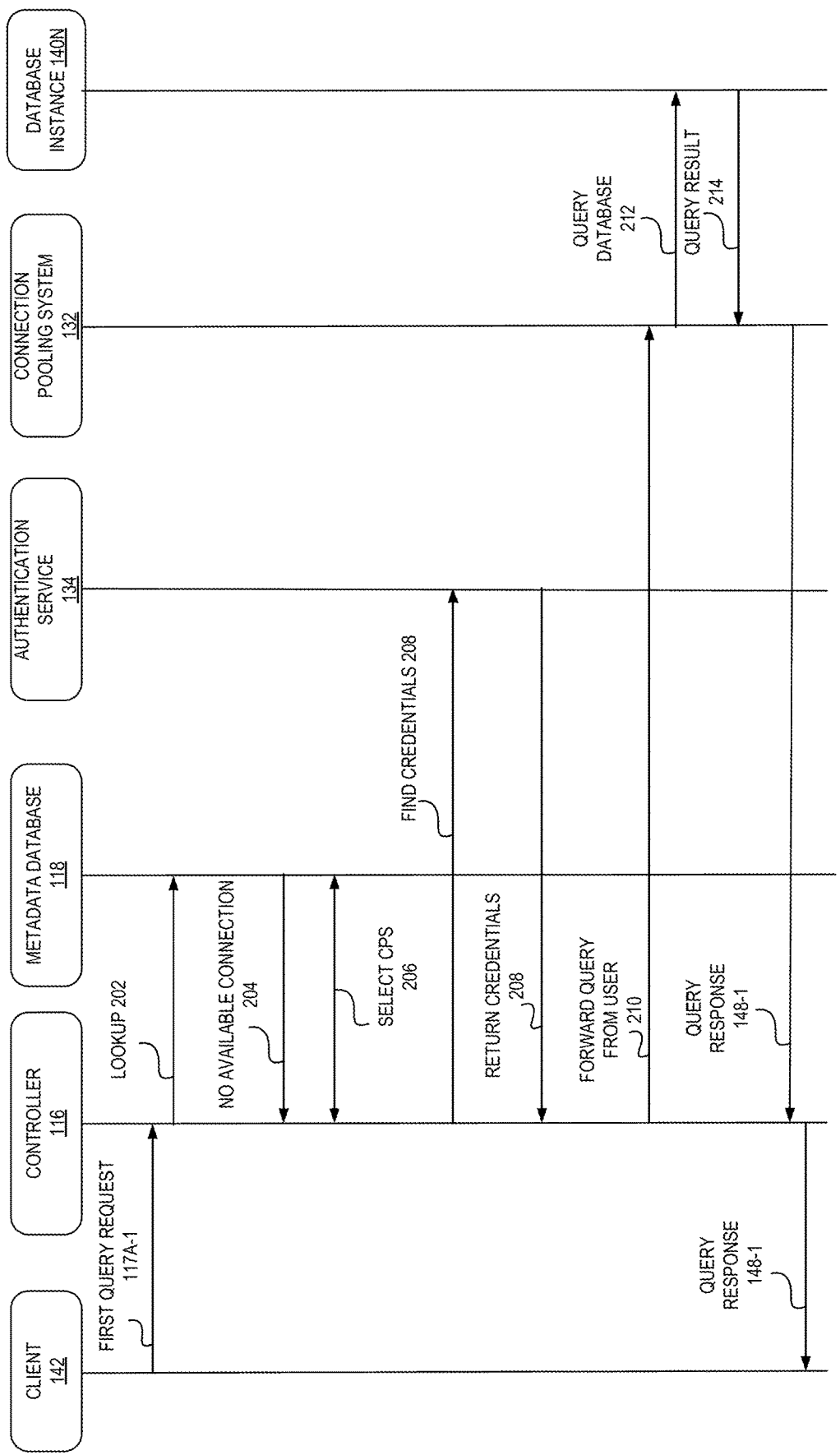
FIG. 2 is a diagram illustrating exemplary messaging between components of an environment for processing a first query request from a user according to some embodiments.
Figure 3:
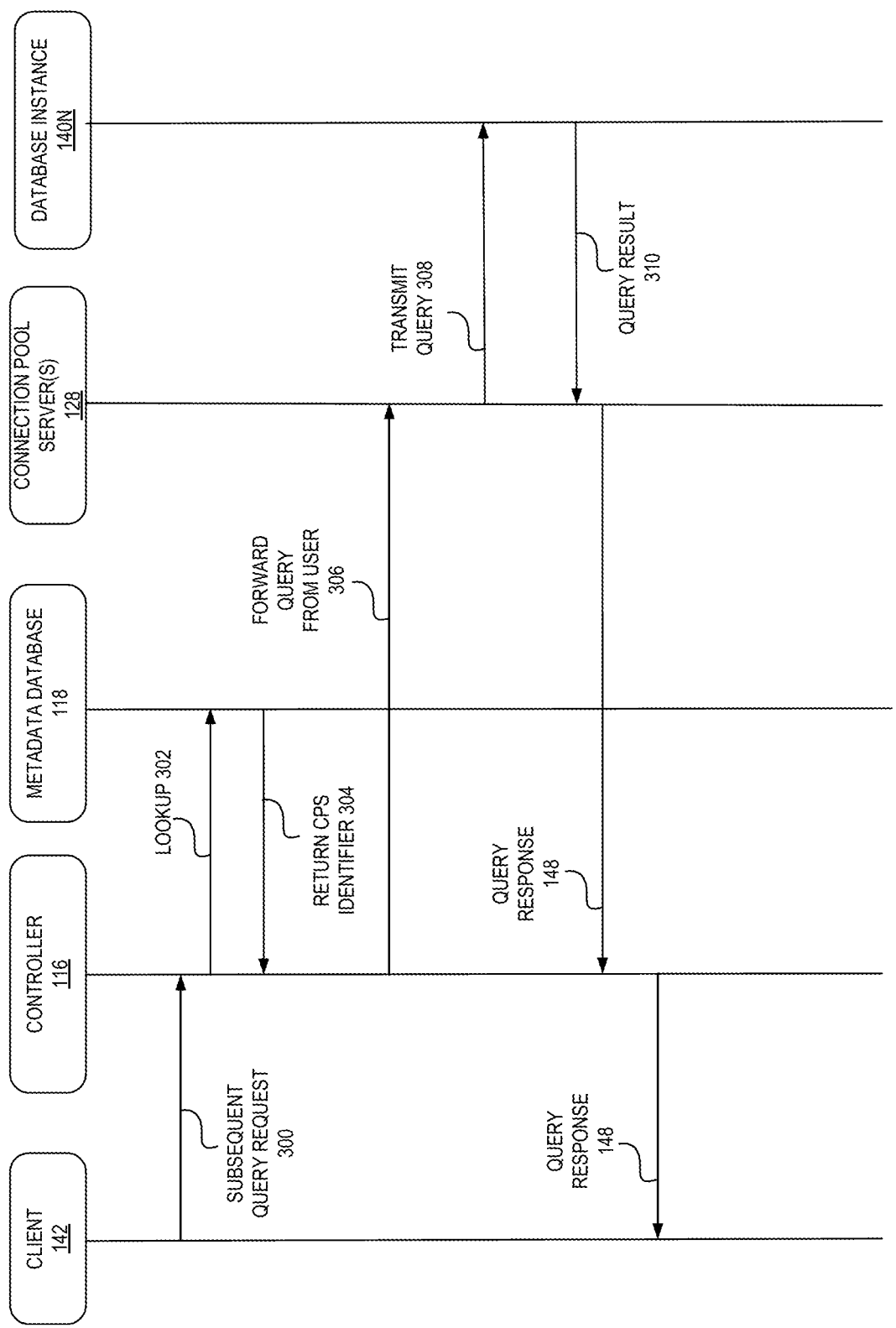
FIG. 3 is a diagram illustrating exemplary messaging between components of an environment for processing subsequent query requests from a user according to some embodiments.

The communication of information between one or more components in FIG. 1 to process queries from users is further described in relation to FIGS. 2 and 3 below. For example, FIG. 2 shows an example messaging flow between one or more components in FIG. 1 when a first query request is received from a user. FIG. 3 shows an example messaging flow between one or more components in FIG. 1 when subsequent query requests are received from a user.

FIG. 2 is a diagram illustrating exemplary messaging between components of an environment for processing a first query request from a user according to some embodiments. FIG. 2 shows an example messaging flow between one or more components in FIG. 1 such as a client 142 executed by an electronic device, a controller 116 of query processing service, an endpoint-to-CPS lookup table 120, an authentication service 134, a connection pooling system 132, and a database instance 140N of a database service. It is to be understood that this messaging flow is only one messaging flow that could be used to implement some embodiments, and various alternate formulations with more or fewer messages, messages in different orderings, more or fewer or different components, etc., could alternatively be used and implemented by one of ordinary skill in the art in possession of this disclosure to implement various embodiments described herein.

A user (via, e.g., a client 142 application) may initiate this process by sending a first query request 117A-1 to the controller 116 of the query processing service. The query request 117A-1 may be sent as an HTTP request and is received at a web service endpoint in the query processing service. In response to the query request, at 202, the controller 116 performs a lookup in the endpoint-to-CPS lookup table 120 in the metadata database 118 to identify a CPS associated with the target database instance. At 204, the controller 116 determines that there is no available connection (i.e., there is no CPS) associated with the target database instance. In response, at 206 the controller 116 may select and identify a CPS from the available CPS list 121 in the metadata database 118 and communicate with the authorization service 134 to authenticate the user making the query request prior to establishing a connection to the target database instance. Upon successful authentication, at 208, the authentication service 134 returns the user's credentials to the controller 116. The controller 116 then directly transmits the query request at 210 to the identified CPS in the connection pooling system 132. At 212, the identified CPS in the connection pooling system 132 initiates the execution of the query against the target database instance (e.g., 140N) by sending the query (and optionally, the additional information such as user authentication/authorization information) directly to the target database instance. At 214, the database instance 140N returns a query result to the CPS in the connection pooling system. Thereafter, the CPS (e.g., via a query adapter) transforms the query result into a query response 148-1 and transmits the query response to the controller 116, which sends it on to the client 142.

FIG. 3 is a diagram illustrating exemplary messaging between components of an environment for processing subsequent query requests from a user according to some embodiments. FIG. 3 shows an example messaging flow between one or more components in FIG. 1 such as a client 142 at an electronic device, a controller 116 of a query processing service, an endpoint-to-CPS lookup table 120, a connection pool server 128, and a database instance 140N of a database service. It is to be understood that this messaging flow is only one messaging flow that could be used to implement some embodiments, and various alternate formulations with more or fewer messages, messages in different orderings, more or fewer or different components, etc., could alternatively be used and implemented by one of ordinary skill in the art in possession of this disclosure to implement various embodiments described herein.

A client 142 application may initiate this process by sending a subsequent query request 300 to the controller 116. The query request 300 is received at a web service endpoint in the provider network. In one example, the query request may be sent as an HTTP request. In response to the query request, at 302, the controller 116 performs a lookup in the endpoint-to-CPS lookup table 120 to identify a CPS associated with the endpoint. At 304, a CPS identifier is returned to the controller 116 based on the lookup. At 306, the controller 116 forwards the query to a connection pool server (e.g., CPS 128A) through use of the CPS identifier (e.g., the destination port and/or destination IP address of the CPS). It may be observed that in the processing of subsequent query requests from a user to a particular target database instance, the controller 116 can directly forward the query request to the identified CPS without identifying and selecting a CPS from the available CPS list 121 because an existing connection (CPS) to the target database already exists.

At 308, the connection pool server 128 identifies the database instance and transmits the query to the database instance 140N for execution. At 310, the database instance 140N provides a query result to the CPS 128. Thereafter, the CPS transforms the query result into a query response 148 and transmits the query response to the user.

FIG. 4 illustrates an example of a web service endpoint creation API request 400 in accordance with an embodiment of the present disclosure. The example endpoint creation API request 400 can be included in an HTTP request that is sent to the query processing service 102 (shown in FIG. 1). As shown in FIG. 4, the endpoint creation API request 400 includes header information specifying, for example, a target database instance identifier for the endpoint 405, the number of connections that can be established for the target database instance 410, and an identifier of authentication information (target database user authentication credentials) 415, among other possible parameters. In some embodiments, this create endpoint API may be implemented by the query processing service, which may also implement a variety of other APIs related to endpoints. As an example, the query processing service may implement an endpoint deletion API that may be invoked by an administrator to delete a particular web service endpoint.

FIG. 5 illustrates an example of an API request to execute a query in accordance with an embodiment of the present disclosure. The example API request 500 may be included in an HTTP request sent to the query processing service. As shown in FIG. 5, this exemplary "execute SQL" API request includes header information specifying, for example, a user-provided name for the target database 505, the target database instance 510, the target schema 515, the SQL statement string 520, and target database user authentication credentials 535, among other possible parameters. In some embodiments, the "execute SQL" API request may be implemented by the query processing service 102, which as noted above, may also implement a variety of other APIs for query execution by users. These APIs may include, for example, a "get items" API that fetches one or more rows from a table in the customer database instance using a SQL predicate provided by the user, an "insert item" API for inserting values for one or more rows in the customer database instance, an "update items" API that updates the values of one or more rows in the customer database instance, a "delete item" request API that deletes zero or more items using an indexed column from a table in the customer database instance, etc.

Figure 6:
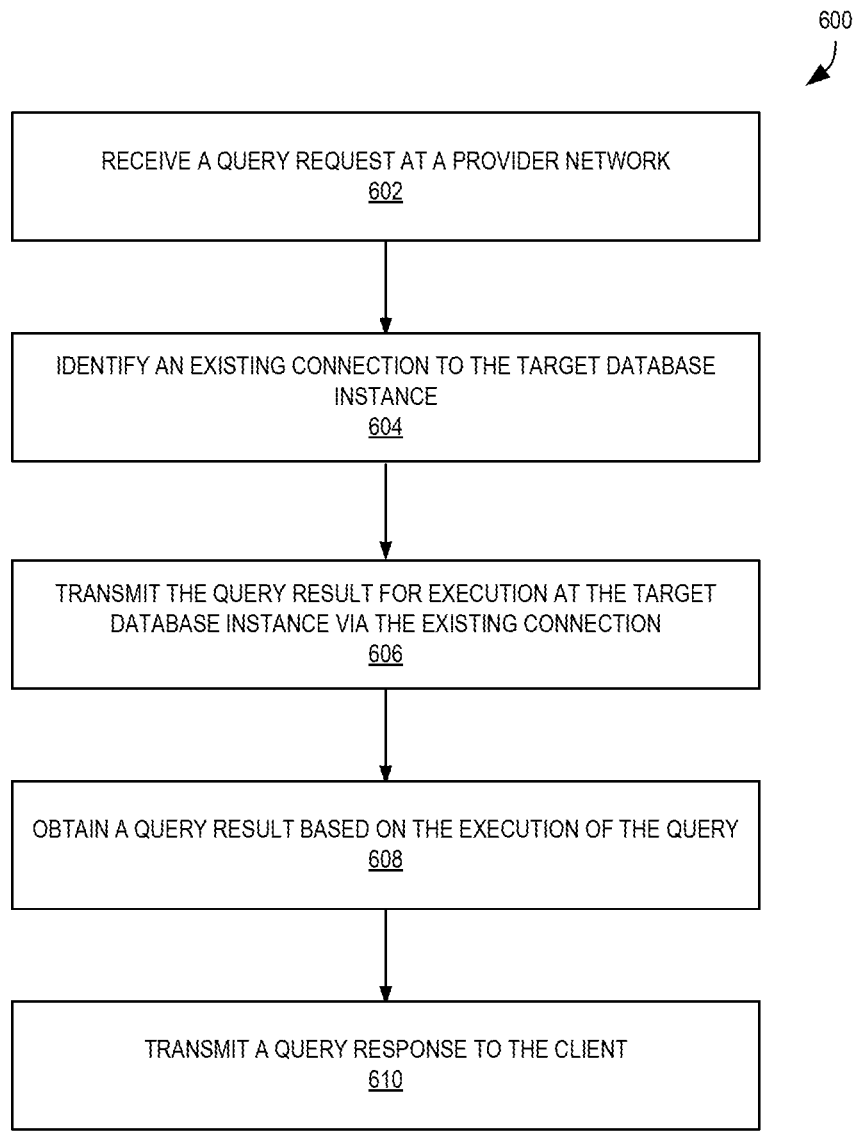
FIG. 6 is a flow diagram illustrating operations of a method for executing queries against a relational database according to some embodiments.

FIG. 6 is a flow diagram illustrating operations 600 of a method for executing queries against a relational database according to some embodiments. Some or all of the operations 600 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 600 are performed by one or more components (e.g., the control plane 112, the controller 116, the endpoint-to-lookup table 120, and the connection pooling system 132) of the provider network 100 shown in FIG. 1.

The operations 600 include, at block 602, receiving a query request at a provider network. In one example, the query request can originate from a client (e.g., 142A shown in FIG. 1) when a user (e.g., 108A) submits a query request. The query request comprises a HTTP message carrying a payload. The payload comprises a query (e.g., an SQL query) to be executed by a target database instance within the provider network 100. The SQL query may be modeled as a web service API request, in certain examples. In one example, the target database instance is a relational database. The target database instance may also comprise a database cluster comprising a plurality of relational database servers, in other examples.

In some embodiments, the operations performed at block 602 may include, prior to receiving the query request, receiving an endpoint configuration request to create a web service endpoint to the target database instance and creating the web service endpoint to the target database instance. The endpoint configuration request comprises, among potentially other parameters, an identifier of the target database instance, the number of connections associated with the target database instance, and an identifier of authentication information associated with accessing the target database instance. The operations performed at block 602 may also include authenticating a user's access to a web service endpoint to the target database instance prior to receiving the query request.

The operations 600 further include, at block 604, identifying an existing connection to the target database instance. The operations performed at block 604 may include, prior to receiving the query request, initializing and/or launching a set of one or more connection pool servers (CPSs) to a plurality of target database instances. The plurality of target database instances includes the target database instance. The operations performed at block 604 may further include associating the target database instance with a first connection pool server in the set of connection pool servers in a lookup data structure (e.g., the endpoint to CPS lookup table 120) and determining using the lookup structure that there is an association of the target database instance to the first connection pool server in the set of connection pool servers. The operations performed at block 604 may also include authenticating a user's access to the target database instance prior to transmitting the query for execution at the target database instance via the existing connection.

In certain embodiments, the operations performed at block 604 may include determining, after the receipt of the query request, determining that there is no association of the target database instance to any connection pool server in the set of connection pool servers in the lookup data structure and associating a first connection pool server with the target database instance in the lookup data structure.

The operations 600 further include, at block 606, transmitting the query result for execution at the target database instance via the existing connection. The operations 600 include, at block 608, obtaining a query result based on the execution of the query. The operations at block 608 may include transforming the query result into a query format associated with the client prior to transmitting the query response to the client. The operations 600 further include, at block 610, transmitting a query response to the client based on the query result.

Figure 7:
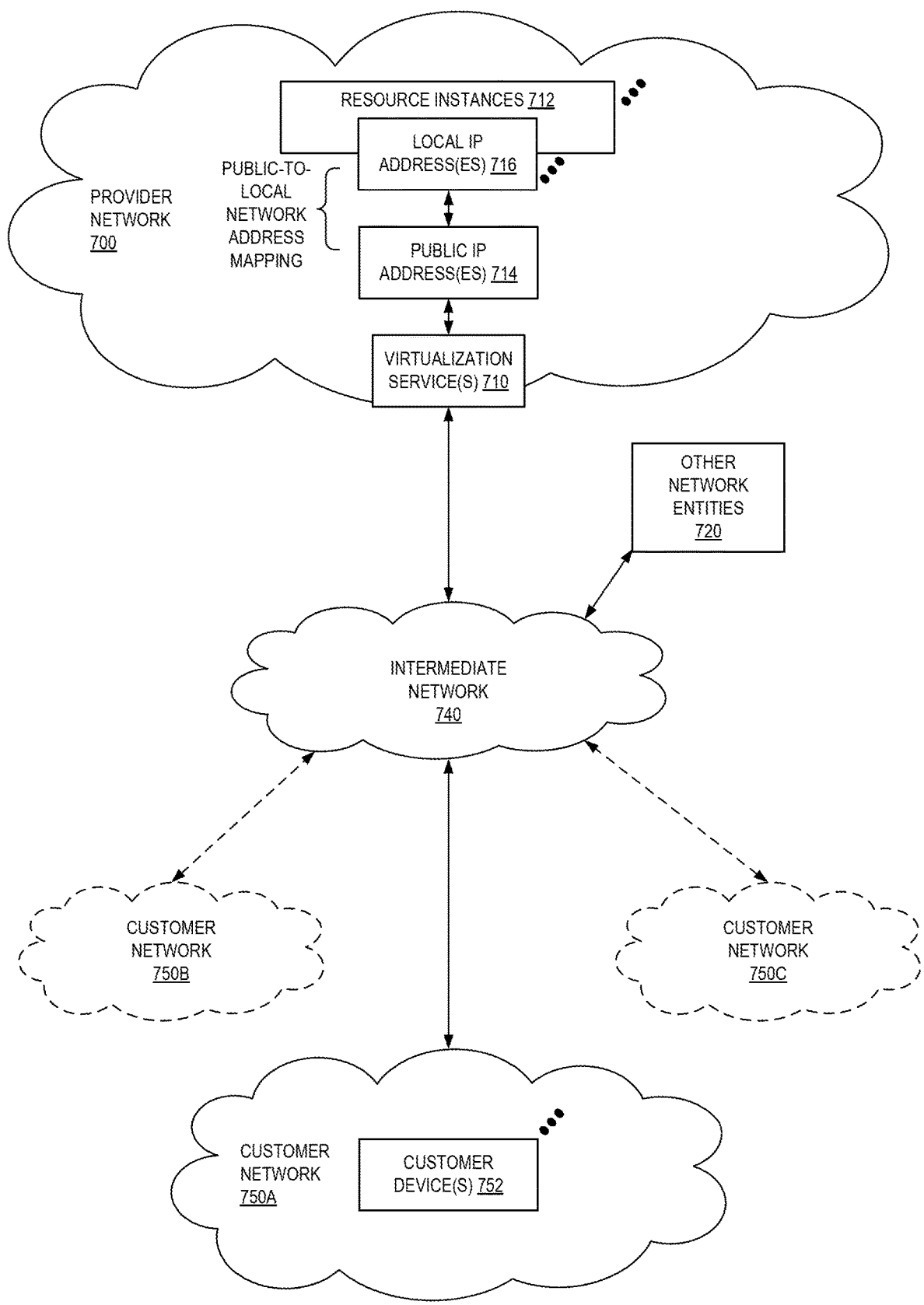
FIG. 7 illustrates an example provider network environment according to some embodiments.

FIG. 7 illustrates an example provider network (or "service provider system") environment according to some embodiments. A provider network 700 may provide resource virtualization to customers via one or more virtualization services 710 that allow customers to purchase, rent, or otherwise obtain instances 712 of virtualized resources, including but not limited to computation and storage resources, implemented on devices within the provider network or networks in one or more data centers. Local Internet Protocol (IP) addresses 716 may be associated with the resource instances 712; the local IP addresses are the internal network addresses of the resource instances 712 on the provider network 700. In some embodiments, the provider network 700 may also provide public IP addresses 714 and/or public IP address ranges (e.g., Internet Protocol version 4 (IPv4) or Internet Protocol version 6 (IPv6) addresses) that customers may obtain from the provider 700.

Conventionally, the provider network 700, via the virtualization services 710, may allow a customer of the service provider (e.g., a customer that operates one or more client networks 750A-750C including one or more customer device(s) 752) to dynamically associate at least some public IP addresses 714 assigned or allocated to the customer with particular resource instances 712 assigned to the customer. The provider network 700 may also allow the customer to remap a public IP address 714, previously mapped to one virtualized computing resource instance 712 allocated to the customer, to another virtualized computing resource instance 712 that is also allocated to the customer. Using the virtualized computing resource instances 712 and public IP addresses 714 provided by the service provider, a customer of the service provider such as the operator of customer network(s) 750A-750C may, for example, implement customer-specific applications and present the customer's applications on an intermediate network 740, such as the Internet. Other network entities 720 on the intermediate network 740 may then generate traffic to a destination public IP address 714 published by the customer network(s) 750A-750C; the traffic is routed to the service provider data center, and at the data center is routed, via a network substrate, to the local IP address 716 of the virtualized computing resource instance 712 currently mapped to the destination public IP address 714. Similarly, response traffic from the virtualized computing resource instance 712 may be routed via the network substrate back onto the intermediate network 740 to the source entity 720.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193, and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 700; a customer may then assign their allocated public IP addresses to particular resource instances allocated to the customer. These public IP addresses may be referred to as customer public IP addresses, or simply customer IP addresses. Instead of being assigned by the provider network 700 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 8:
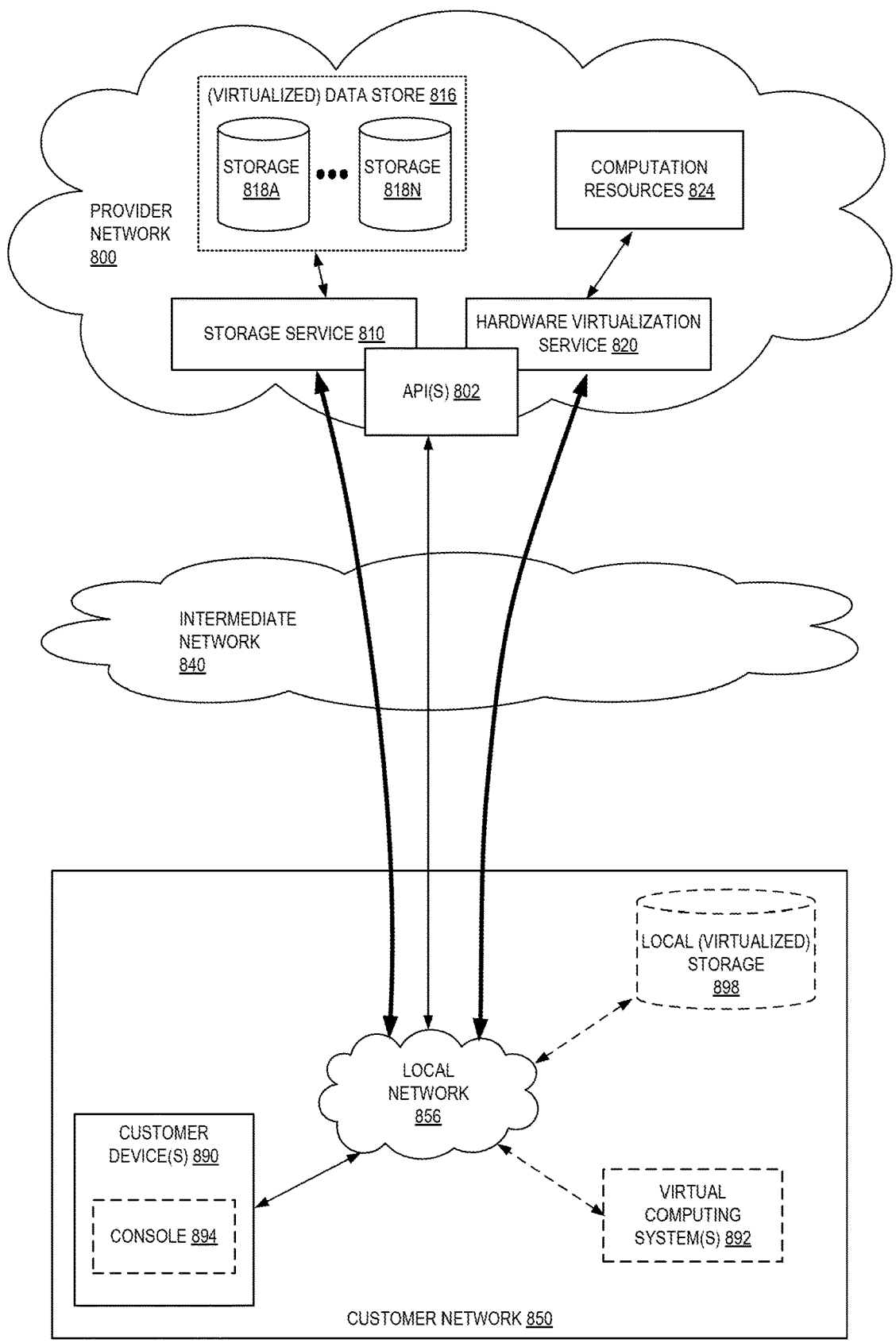
FIG. 8 is a block diagram of an example provider network that provides a storage service and a hardware virtualization service to customers according to some embodiments.

FIG. 8 is a block diagram of an example provider network that provides a storage service and a hardware virtualization service to customers, according to some embodiments. Hardware virtualization service 820 provides multiple computation resources 824 (e.g., VMs) to customers. The computation resources 824 may, for example, be rented or leased to customers of the provider network 800 (e.g., to a customer that implements customer network 850). Each computation resource 824 may be provided with one or more local IP addresses. Provider network 800 may be configured to route packets from the local IP addresses of the computation resources 824 to public Internet destinations, and from public Internet sources to the local IP addresses of computation resources 824.

Provider network 800 may provide a customer network 850, for example coupled to intermediate network 840 via local network 856, the ability to implement virtual computing systems 892 via hardware virtualization service 820 coupled to intermediate network 840 and to provider network 800. In some embodiments, hardware virtualization service 820 may provide one or more APIs 802, for example a web services interface, via which a customer network 850 may access functionality provided by the hardware virtualization service 820, for example via a console 894 (e.g., a web-based application, standalone application, mobile application, etc.). In some embodiments, at the provider network 800, each virtual computing system 892 at customer network 850 may correspond to a computation resource 824 that is leased, rented, or otherwise provided to customer network 850.

From an instance of a virtual computing system 892 and/or another customer device 890 (e.g., via console 894), the customer may access the functionality of storage service 810, for example via one or more APIs 802, to access data from and store data to storage resources 818A-818N of a virtual data store 816 (e.g., a folder or "bucket", a virtualized volume, a database, etc.) provided by the provider network 800. In some embodiments, a virtualized data store gateway (not shown) may be provided at the customer network 850 that may locally cache at least some data, for example frequently-accessed or critical data, and that may communicate with storage service 810 via one or more communications channels to upload new or modified data from a local cache so that the primary store of data (virtualized data store 816) is maintained. In some embodiments, a user, via a virtual computing system 892 and/or on another customer device 890, may mount and access virtual data store 816 volumes via storage service 810 acting as a storage virtualization service, and these volumes may appear to the user as local (virtualized) storage 898.

Figure 9:
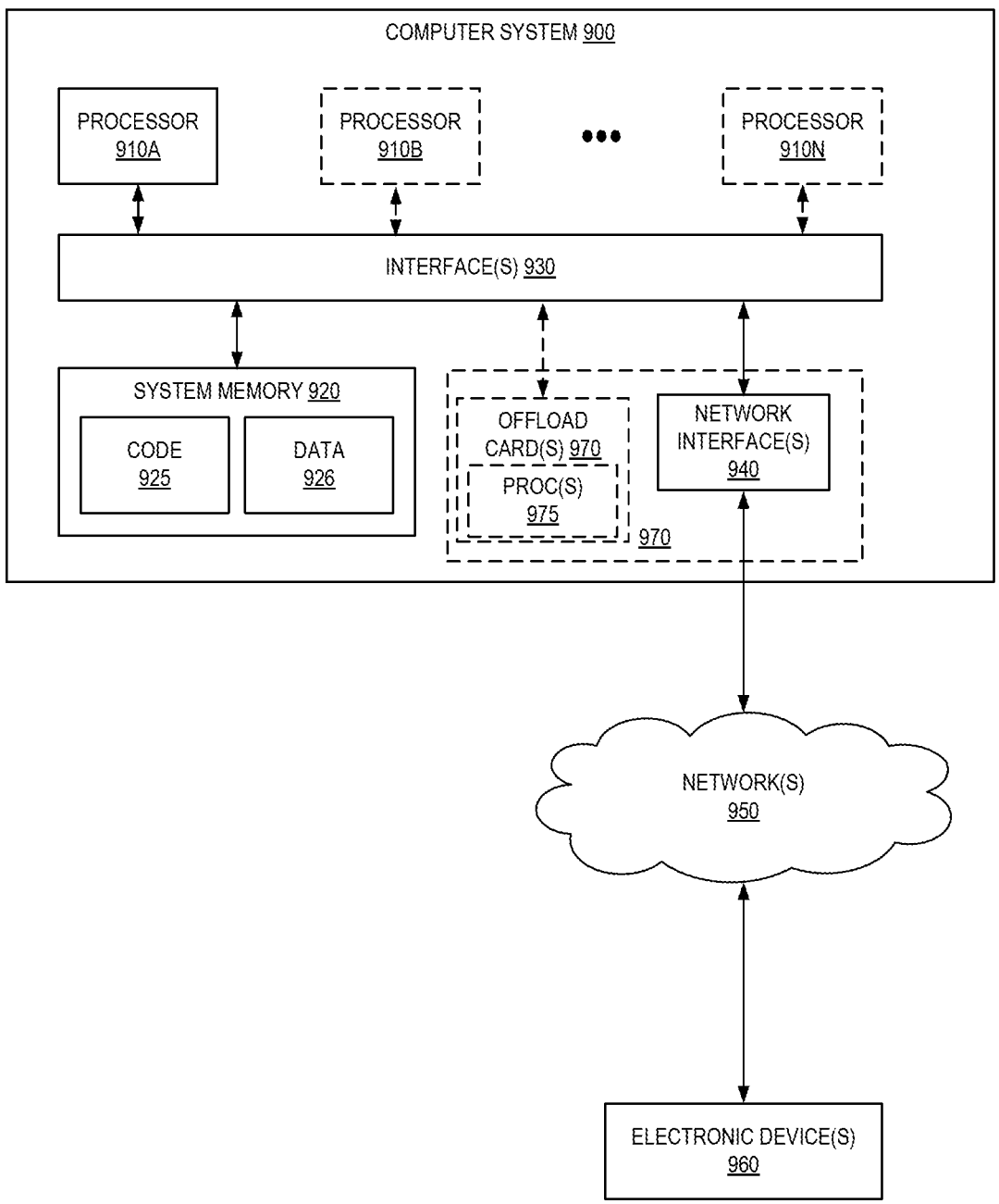
FIG. 9 is a block diagram illustrating an example computer system that may be used in some embodiments.

While not shown in FIG. 8, the virtualization service(s) may also be accessed from resource instances within the provider network 800 via API(s) 802. For example, a customer, appliance service provider, or other entity may access a virtualization service from within a respective virtual network on the provider network 800 via an API 802 to request allocation of one or more resource instances within the virtual network or within another virtual network.
Illustrative System In some embodiments, a system that implements a portion or all of the techniques for query execution in relational database services as described herein may include a general-purpose computer system that includes or is configured to access one or more computer-accessible media, such as computer system 900 illustrated in FIG. 9. In the illustrated embodiment, computer system 900 includes one or more processors 910 coupled to a system memory 920 via an input/output (I/O) interface 930. Computer system 900 further includes a network interface 940 coupled to I/O interface 930. While FIG. 9 shows computer system 900 as a single computing device, in various embodiments a computer system 900 may include one computing device or any number of computing devices configured to work together as a single computer system 900.

In various embodiments, computer system 900 may be a uniprocessor system including one processor 910, or a multiprocessor system including several processors 910 (e.g., two, four, eight, or another suitable number). Processors 910 may be any suitable processors capable of executing instructions. For example, in various embodiments, processors 910 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 910 may commonly, but not necessarily, implement the same ISA.

System memory 920 may store instructions and data accessible by processor(s) 910. In various embodiments, system memory 920 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 920 as code 925 and data 926.

In one embodiment, I/O interface 930 may be configured to coordinate I/O traffic between processor 910, system memory 920, and any peripheral devices in the device, including network interface 940 or other peripheral interfaces. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computer system 900 and other devices 960 attached to a network or networks 950, such as other computer systems or devices as illustrated in FIG. 1, for example. In various embodiments, network interface 940 may support communication via any suitable wired or wireless general data networks, such as types of Ethernet network, for example. Additionally, network interface 940 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 900 includes one or more offload cards 970 (including one or more processors 975, and possibly including the one or more network interfaces 940) that are connected using an I/O interface 930 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 900 may act as a host electronic device (e.g., operating as part of a hardware virtualization service) that hosts compute instances, and the one or more offload cards 970 execute a virtualization manager that can manage compute instances that execute on the host electronic device. As an example, in some embodiments the offload card(s) 970 can perform compute instance management operations such as pausing and/or un-pausing compute instances, launching and/or terminating compute instances, performing memory transfer/copying operations, etc. These management operations may, in some embodiments, be performed by the offload card(s) 970 in coordination with a hypervisor (e.g., upon a request from a hypervisor) that is executed by the other processors 910A-910N of the computer system 900. However, in some embodiments the virtualization manager implemented by the offload card(s) 970 can accommodate requests from other entities (e.g., from compute instances themselves), and may not coordinate with (or service) any separate hypervisor.

In some embodiments, system memory 920 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 900 via I/O interface 930. A non-transitory computer-accessible storage medium may also include any volatile or non-volatile media such as RAM (e.g., SDRAM, double data rate (DDR) SDRAM, SRAM, etc.), read only memory (ROM) etc., that may be included in some embodiments of computer system 900 as system memory 920 or another type of memory. Further, a computer-accessible medium may include transmission media or signals such as electrical, electromagnetic, or digital signals, conveyed via a communication medium such as a network and/or a wireless link, such as may be implemented via network interface 940.

Various embodiments discussed or suggested herein can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of commercially-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C # or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 818A-818N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
receiving, at a query processing service of a provider network, an endpoint configuration request to create a web service endpoint to a target database instance within the provider network, the endpoint configuration request comprising an identifier of the target database instance;
creating the web service endpoint to the target database instance;
configuring the web service endpoint to the target database instance;
receiving, at the web service endpoint to the target database instance, a query request originated by a client and comprising a Hyper Text Transfer Protocol (HTTP) message carrying a payload comprising a statement to be executed by the target database instance within the provider network, wherein the target database instance is a relational database;
identifying, by the query processing service, an existing connection to the target database instance by determining an association of the web service endpoint to a first connection pool server in a set of connection pool servers that connects to a plurality of target database instances, the plurality of target database instances including the target database instance, wherein the set of connection pool servers are initialized prior to receiving the query request;
transmitting the statement for execution at the target database instance via the existing connection;
obtaining a query result based on the execution of the statement;
transforming the query result into another structured format; and
transmitting a query response to the client, wherein the query response comprises the transformed query result.

2. The computer-implemented method of claim 1, wherein the endpoint configuration request further comprises header information specifying a number of connections that can be established for the target database instance.

3. The computer-implemented method of claim 1, wherein the query request is received via an Application Programming Interface (API) within the provider network that subsequently transmits the query request to a controller in the query processing service.

4. A computer-implemented method comprising:
receiving, at a query processing service of a provider network, an endpoint configuration request to create a web service endpoint to a target database instance within the provider network, the endpoint configuration request comprising an identifier of the target database instance;
creating the web service endpoint to the target database instance;
configuring the web service endpoint to the target database instance;
receiving, at the web service endpoint to the target database instance, a query request originated by a client and comprising a Hyper Text Transfer Protocol (HTTP) message carrying a payload comprising a statement to be executed by the target database instance within the provider network, wherein the target database instance is a relational database;
identifying, by the query processing service, an existing connection to the target database instance by determining an association of the web service endpoint to a first connection pool server in a set of connection pool servers that connects to a plurality of target database instances, the plurality of target database instances including the target database instance;

transmitting the statement for execution at the target database instance via the existing connection;
obtaining a query result based on the execution of the statement; and
transmitting a query response to the client, wherein the query response is based on the query result.

5. The computer-implemented method of claim 4, wherein the endpoint configuration request further comprises header information specifying a number of connections that can be established for the target database instance.

6. The computer-implemented method of claim 5, wherein the endpoint configuration request further comprises a target database instance identifier and an identifier of authentication information associated with accessing the target database instance.

7. The computer-implemented method of claim 4, further comprising:
prior to receiving the query request, launching the set of connection pool servers for connection to the plurality of target database instances.

8. The computer-implemented method of claim 7, further comprising:
associating the target database instance with the first connection pool server in a lookup data structure,
wherein identifying the existing connection to the target database instance comprises determining, using the lookup data structure, that there is an association of the target database instance to the first connection pool server, and
wherein transmitting the statement for execution at the target database instance via the existing connection comprises transmitting the statement to the first connection pool server.

9. The computer-implemented method of claim 7, further comprising:
after receipt of the query request, determining that there is no association of the target database instance to any connection pool server in the set of connection pool servers in a lookup data structure; and
associating the first connection pool server with the target database instance in the lookup data structure.

10. The computer-implemented method of claim 4, further comprising:
prior to receiving the query request, authenticating a user's access to the web service endpoint.

11. The computer-implemented method of claim 4, further comprising:
after receiving the query request but prior to transmitting the statement for execution at the target database instance via the existing connection, authenticating a user's access to the target database instance.

12. The computer-implemented method of claim 4, further comprising transforming the query result into a structured format prior to transmitting the query response to the client.

13. The computer-implemented method of claim 4, wherein the target database instance comprises a database cluster comprising a plurality of relational database servers.

14. The computer-implemented method of claim 4, wherein the query request is received via an Application Programming Interface (API) within the provider network that subsequently transmits the query request to a controller in the query processing service.

15. A system comprising:
a first one or more electronic devices implementing a database service, wherein the database service implements a plurality of target database instances for a plurality of users of a provider network; and
a second one or more electronic devices implementing a query processing service, the query processing service including instructions that upon execution by one or more processors cause the query processing service to:
receive an endpoint configuration request to create a web service endpoint to a target database instance within the provider network, the endpoint configuration request comprising an identifier of the target database instance;
create the web service endpoint to the target database instance;
configure the web service endpoint to the target database instance;
receive, at a controller via the web service endpoint to the target database instance, a query request, the query request being originated by a client and comprising a HyperText Transfer Protocol (HTTP) message carrying a payload comprising a statement to be executed by the target database instance of the plurality of target database instances implemented by the database service, wherein the target database instance is a relational database;
identify an existing connection to the target database instance by determining an association of the web service endpoint to a first connection pool server in a set of connection pool servers that connects to a plurality of target database instances, the plurality of target database instances including the target database instance;
transmit the statement for execution at the target database instance via the existing connection;
obtain a query result based on the execution of the statement; and
transmit a query response to the client, wherein the query response is based on the query result.

16. The system of claim 15, wherein the endpoint configuration request further comprises header information specifying a number of connections that can be established for the target database instance.

17. The system of claim 16, wherein the target database instance comprises a database cluster comprising a plurality of relational database servers.

18. The system of claim 15, wherein the instructions upon execution further cause the query processing service to:
prior to receipt of the query request, launch the set of connection pool servers for connection to the plurality of target database instances.

19. The system of claim 18, wherein the instructions upon execution further cause the query processing service to:
associate the target database instance with the first connection pool server in a lookup data structure,
wherein the instructions to identify the existing connection to the target database instance comprise instructions to determine, using the lookup data structure, that there is an association of the target database instance to the first connection pool server, and
wherein the instructions to transmit the statement for execution at the target database instance via the existing connection comprise instructions to transmit the statement to the first connection pool server.

20. The system of claim 15, wherein the instructions upon execution further cause the query processing service to:
after receipt of the query request, determine that there is no association of the target database instance to any connection pool server in the set of connection pool servers in a lookup data structure; and associate the first connection pool server with the target database instance in the lookup data structure.

\* \* \* \* \*